US008366089B2

(12) United States Patent
Chen

(10) Patent No.: US 8,366,089 B2
(45) Date of Patent: Feb. 5, 2013

(54) LOCK MECHANISM FOR BAR CLAMP

(75) Inventor: Wei-Li Chen, Taichung (TW)

(73) Assignee: Lai Lien Steel Co., Ltd., Taichung (TW)

( * ) Notice: Subject to any disclaimer, the term of this patent is extended or adjusted under 35 U.S.C. 154(b) by 485 days.

(21) Appl. No.: 12/769,661

(22) Filed: Apr. 29, 2010

(65) Prior Publication Data

US 2011/0266734 A1 Nov. 3, 2011

(51) Int. Cl.

| | |
|---|---|
| ***B25B 1/00*** | (2006.01) |
| ***B25B 1/14*** | (2006.01) |
| ***B25B 5/14*** | (2006.01) |
| ***B25B 1/02*** | (2006.01) |
| ***B25B 5/00*** | (2006.01) |
| ***B25B 27/14*** | (2006.01) |
| ***B23Q 3/02*** | (2006.01) |
| ***B23P 19/04*** | (2006.01) |

(52) U.S. Cl. .................. 269/147; 269/3; 269/6; 269/95; 269/228; 269/116; 269/214; 269/149; 29/257; 29/276

(58) Field of Classification Search .................. 269/3, 6, 269/95, 228, 116, 214, 149, 249, 147; 29/257, 29/276

See application file for complete search history.

(56) References Cited

U.S. PATENT DOCUMENTS 6,412,767 B1 * 7/2002 Beckmann et al. ........... 269/166

* cited by examiner

*Primary Examiner* — Monica Carter
*Assistant Examiner* — Nirvana Deonauth

(57) ABSTRACT

A bar clamp includes a handgrip; a fixed jaw carrier; a slide bar comprising two opposite wing members; a moveable jaw carrier and comprising a transverse channel, a trough extending from center of the channel to one end of the channel, a bottom recess, and two opposite stop members in the recess wherein the slide bar passes the channel with the wing members being stopped by the trough in a locked position; and a U-shaped spring-actuated lock assembly in the recess and comprising inverted U-shaped opposite first and second lock members being engaged with the wing members in the locked position, and first and second projections between the lock members and a bottom of the lock assembly and being engaged with the stop members in the locked position. Pushing the locking assembly until being stopped will disengage the lock members from the wing members.

8 Claims, 10 Drawing Sheets

LOCK MECHANISM FOR BAR CLAMP

BACKGROUND OF THE INVENTION

1. Field of Invention

The invention relates to bar clamps and more particularly to an improved lock mechanism for a bar clamp.

2. Description of Related Art

A typical lock mechanism for a bar clamp is shown in FIGS. 1, 2A and 2B. The slide bar comprises a slide bar 10 of rectangular longitudinal section including a through hole 11 of circular section, a housing with a moveable jaw carrier 12 integrally formed therewith, the moveable jaw carrier 12 having a channel 121 therethrough; a knob shaped slide member 20 including a rod 21 secured to an inner surface, the slide member 20 being slidably retained in a recess on one surface of the moveable jaw carrier 12 with the rod 21 also slidably disposed in the recess and the through hole 11; and a push button 30 including a shaft 31 extending from an inner surface, and a helical spring 32 put on the shaft 31, the push button 30 slidably retained in a recess on the other opposite surface of the moveable jaw carrier 12. The shaft 31, the through hole 11, and the rod 21 are aligned.

In a locked position, the rod 21 is partially disposed in the through hole 11 to lock the moveable jaw carrier 12 (see FIG. 2A). For unlocking the moveable jaw carrier 12, a user may push the push button 30 to cause the shaft 31 to push the rod 21 with the spring 32 being compressed until the rod 21 completely leaves the through hole 11 (see FIG. 2B).

However, the rod 21 may enter or leave the through hole 11 without force being exerted upon the slide member 20 after a period of time of use. This is because the sliding nature of the slide member 20 and wear. As a result, the desired reliable locking function is compromised. Thus, the need for improvement still exists.

SUMMARY OF THE INVENTION

It is therefore one object of the invention to provide a bar clamp comprising a handgrip; a fixed jaw carrier comprising a first jaw; a slide bar comprising two opposite wing members; a moveable jaw carrier disposed in front of the fixed jaw carrier and comprising a second jaw at one end, a transverse channel, a trough extending from an intermediate portion of the channel to one end of the channel, a recess opposing the second jaw, and two opposite stop members in the recess wherein the slide bar passes the channel with the wing members being stopped by the trough in a locked position; and a spring-actuated lock assembly slidably mounted in the recess and having a longitudinal section of U, the lock assembly comprising inverted U-shaped opposite first and second lock members being engaged with the wing members in the locked position, a first projection between the first lock member and a bottom of the lock assembly, and a second projection between the second lock member and the bottom of the lock assembly, the first and second projections being engaged with the stop members in the locked position, whereby pushing the locking assembly until being stopped will disengage the first and second lock members from the wing members to dispose both the slide bar and the moveable jaw carrier in an unlocked position.

The above and other objects, features and advantages of the invention will become apparent from the following detailed description taken with the accompanying drawings.

DETAILED DESCRIPTION OF THE INVENTION

Figure 1:
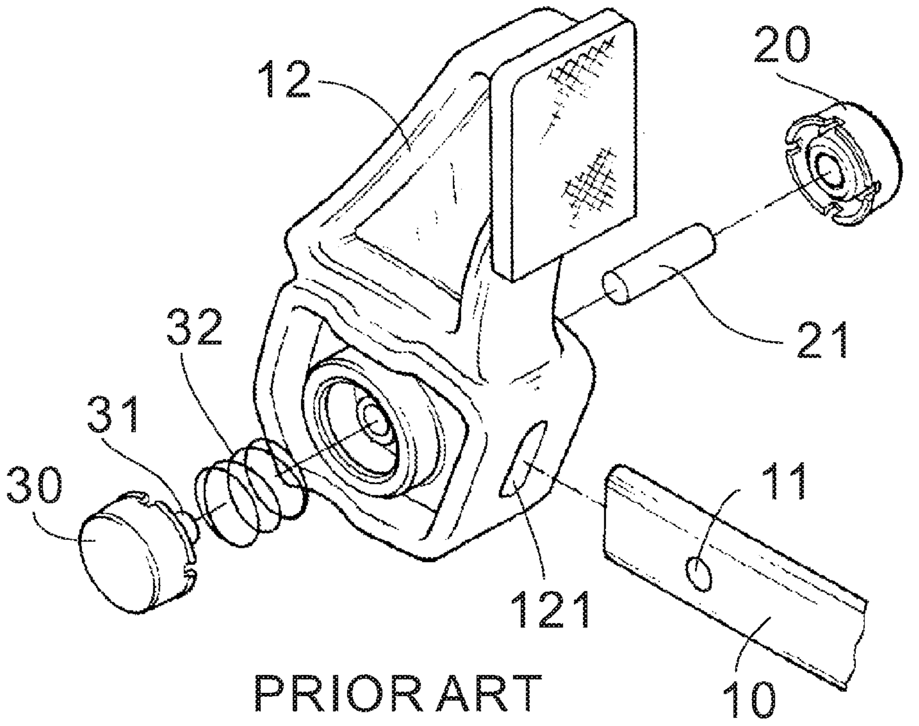
PRIOR ART FIG. 1
FIG. 1 is an exploded view of a typical lock mechanism for bar clamp.
Figure 2A:
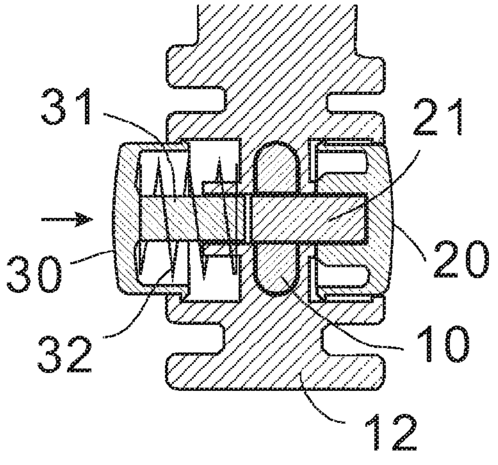
PRIOR ART FIG. 2A
FIG. 2A is a longitudinal sectional view of the housing with the moveable jaw carrier formed thereon, where the slide bar is locked.
Figure 2B:
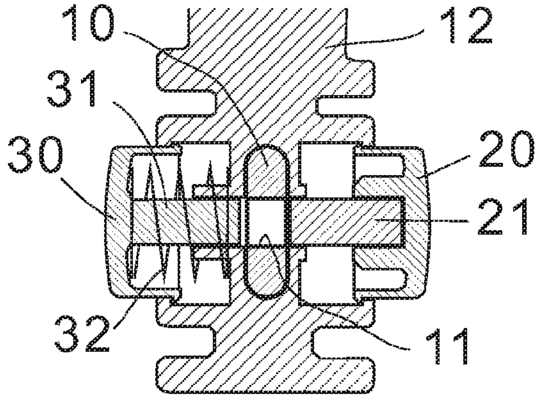
PRIOR ART FIG. 2B
FIG. 2B is a view similar to FIG. 2 wherein the slide bar is unlocked.
Figure 3:
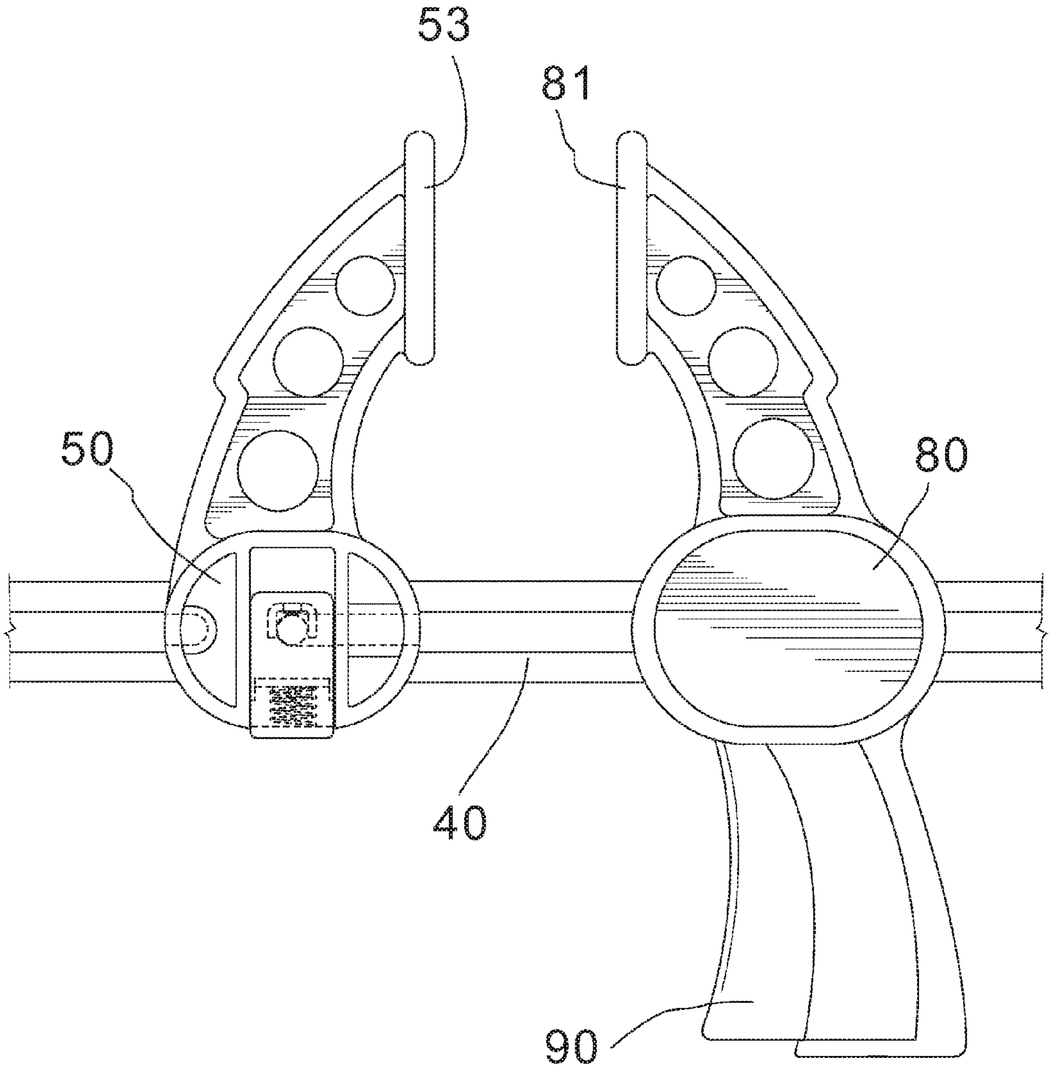
FIG. 3 is a side elevation of a bar clamp incorporating a lock mechanism according to a first preferred embodiment of the invention.
Figure 4:
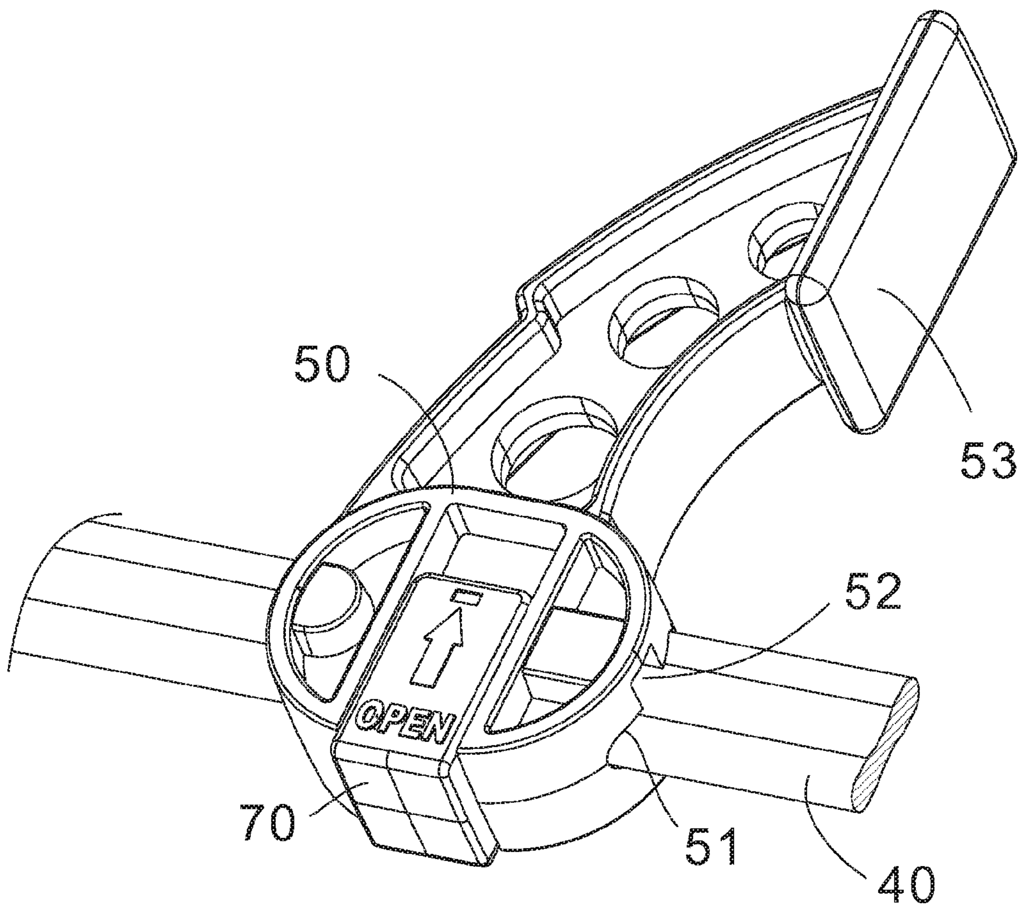
FIG. 4 is a fragmentary view of the slide bar and the moveable jaw carrier of FIG. 3.
Figure 5:
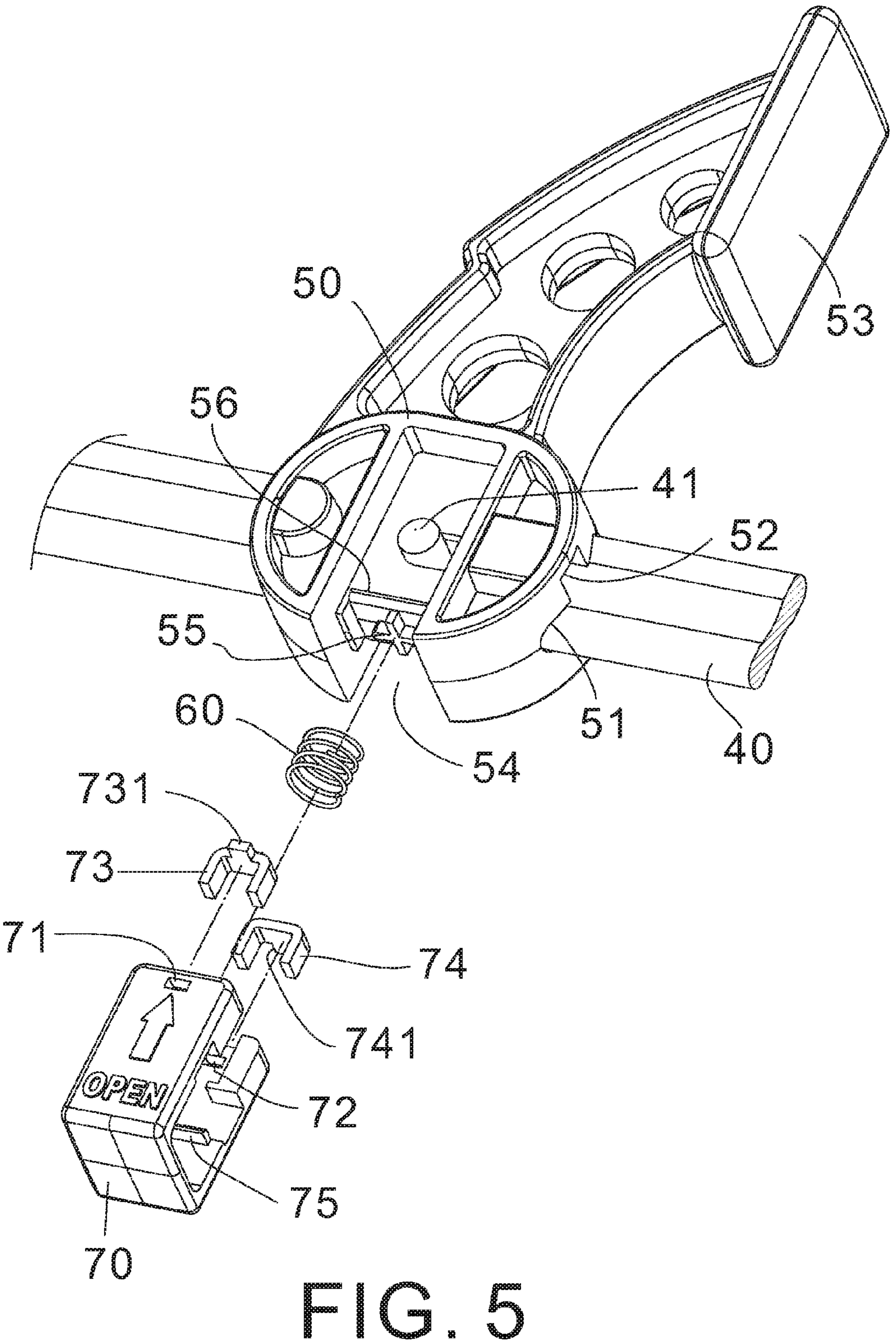
FIG. 5 is a perspective exploded view of FIG. 4.
Figure 6:
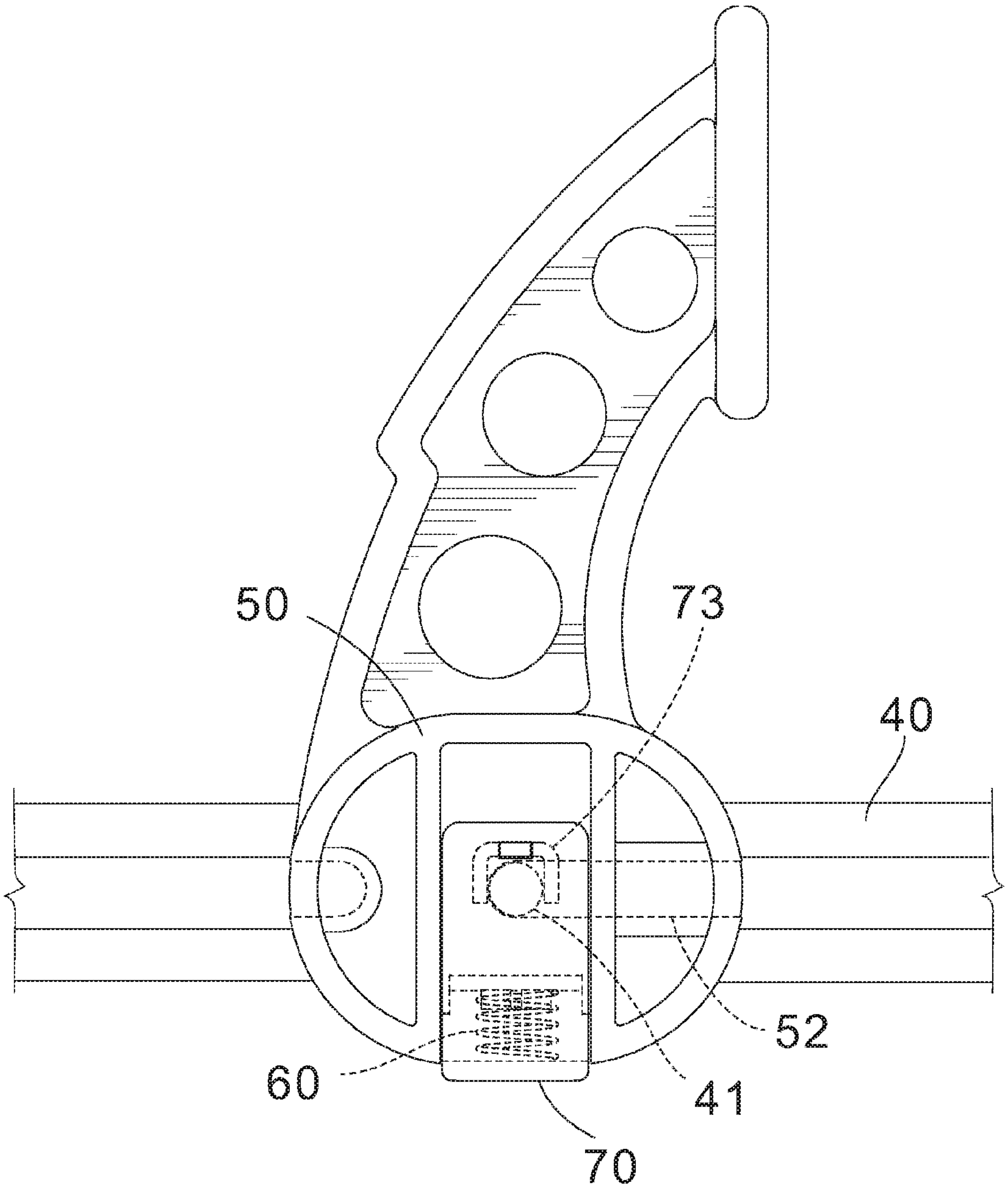
FIG. 6 is a side elevation of FIG. 4 where the moveable jaw carrier is locked.

Referring to FIGS. 3 to 9B, a bar clamp in accordance with a first preferred embodiment of the invention comprises the following components as discussed in detail below.

A handgrip 9 and a first moveable jaw carrier 80 having a jaw 81 all are formed together. The first moveable jaw carrier 80 is locked in a normal position and can be unlocked by pressing the handgrip 9 as well known in the art. Alternatively, the first moveable jaw carrier 80 is replaced with a fixed jaw carrier in other embodiments.

A slide bar 40 passes the first moveable jaw carrier 80. A second moveable jaw carrier 50 is slidably mounted in front of the first moveable jaw carrier 80 and is locked or unlocked by a lock mechanism which is the subject of the invention that will be explained below.

The second moveable jaw carrier 50 comprises a transverse channel 51, a trough 52 extending from a center of the channel 51 to the right side of the channel 51 (see FIG. 5), a jaw 53 at one end of an arcuate arm of the second moveable jaw carrier 50, a bottom recess 54, a cross-shaped anchor member 55 on an inner end of the anchor member 55, and two extending stop members 56 at both ends of the anchor member 55.

The slide bar 40 is somewhat flat and has a central, arcuate groove (not numbered) on either surface and a cylindrical wing member 41 formed on either groove. The slide bar 40 passes the channel 51 until being stopped by the blind end of the trough 52 in its normal position.

Figure 7:
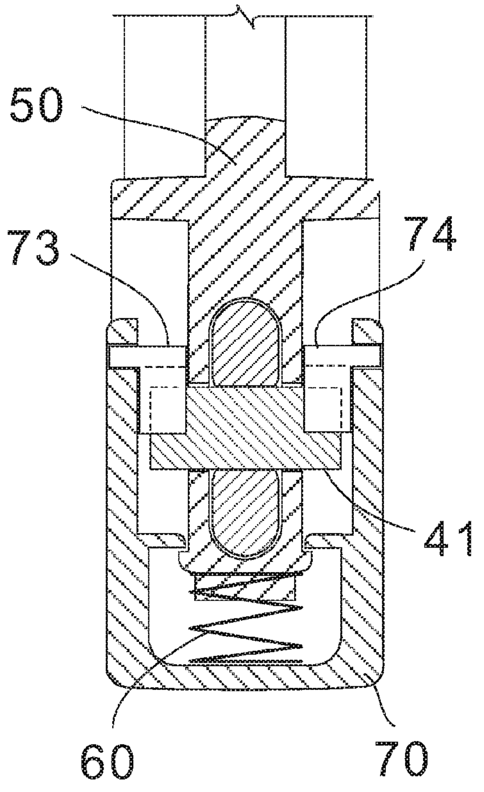
FIG. 7 is a longitudinal sectional view of a lower central portion of FIG. 6 where the moveable jaw carrier is locked.

A lock assembly 70 has a longitudinal section of U and comprises first and second slots 71, 72 proximate top ends of two upright portions, an inverted U-shaped first lock member 73 having a tab 731 fastened in the slot 71, an inverted U-shaped second lock member 74 having a tab 741 fastened in the slot 72, and two opposite projections 75 on two opposite inner surfaces of the upright portions between the slots 71, 72 and the bottom of the lock assembly 70, the projections 75 being engaged with the stop members 56 in a locked position of the lock assembly 70 (see FIG. 7). A helical spring 60 biased between bottom of the locking assembly 70 and the anchor member 55 to urge the stop members 56 against the projections 75 from below. Moreover, the first and second lock members 73, 74 are lockingly engaged with one ends of the wing members 41 by riding thereon respectively (see FIGS. 6 and 7).

Figure 8:
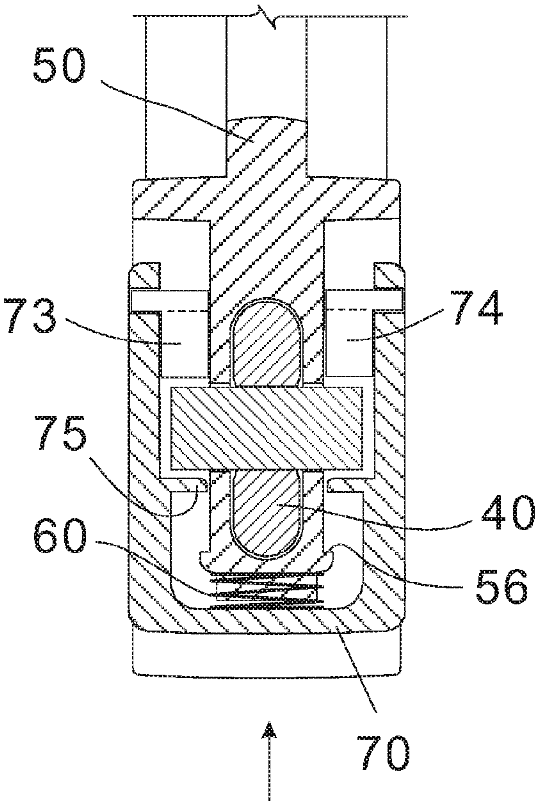
FIG. 8 is a view similar to FIG. 7 where the moveable jaw carrier is unlocked.
Figure 9A:
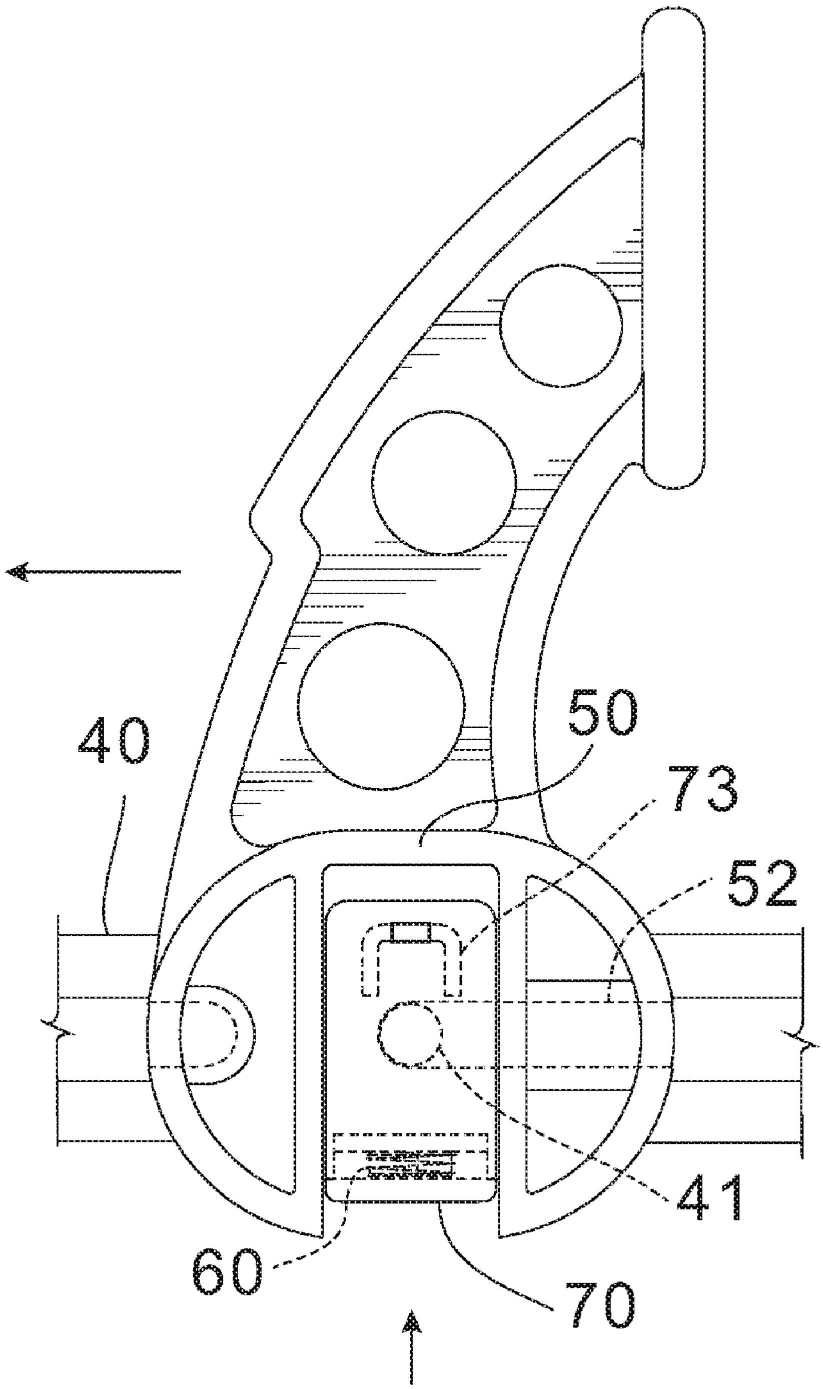
FIG. 9A is a side elevation of FIG. 8.
Figure 9B:
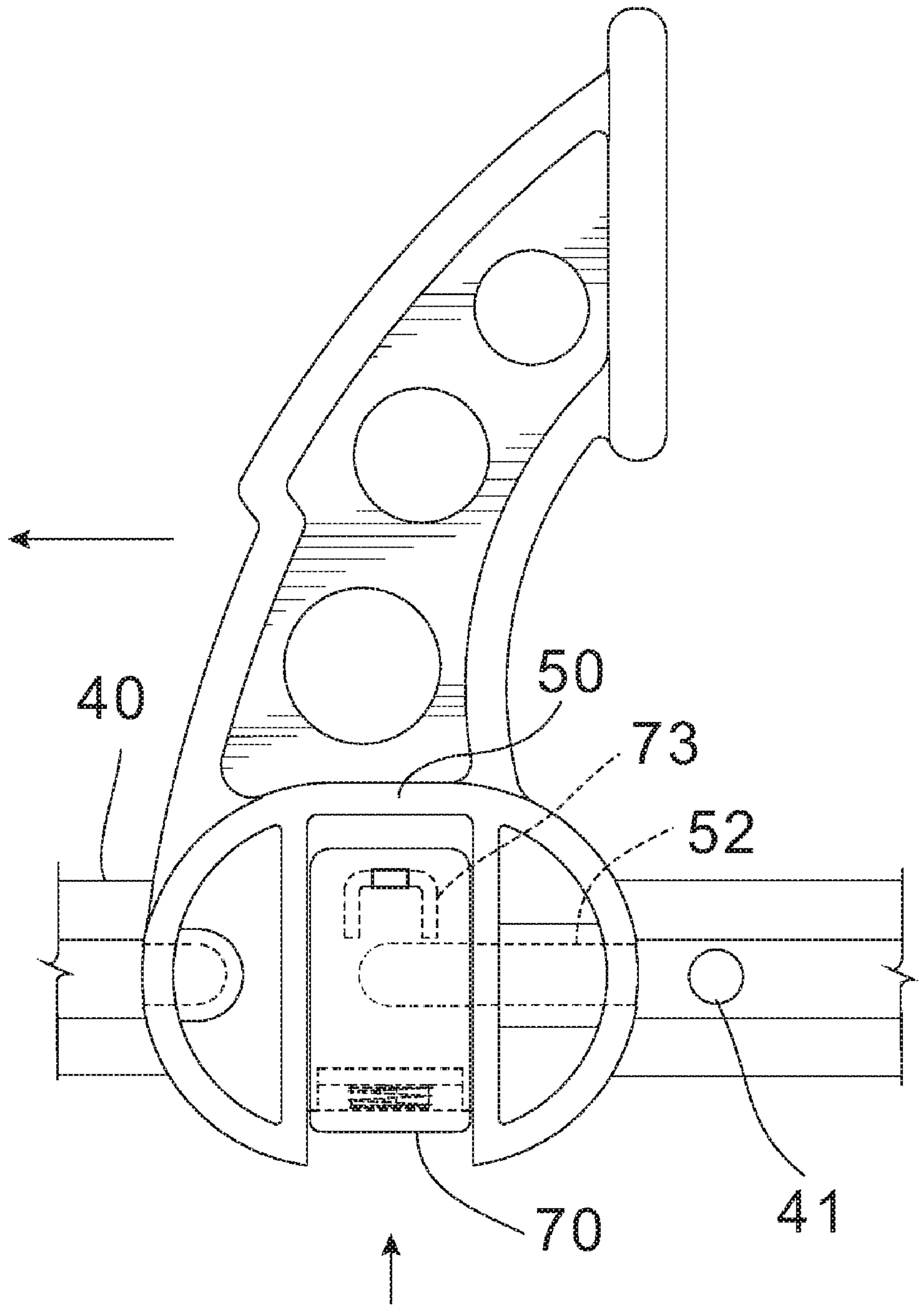
FIG. 9B is a view similar to FIG. 9A showing the moveable jaw carrier having been pushed leftward to adjust a distance between the jaws with the wing members clearing the trough in the adjustment.

For unlocking the second moveable jaw carrier 50, a user may push the locking assembly 70 upward with one hand until being stopped with the spring 60 compressed (see FIG. 8). Both the first and second lock members 73, 74 move upward to disengage from the wing members 41 (see FIGS. 8 and 9A). Next, the user may push the second moveable jaw carrier 50 leftward to adjust a distance between two jaws 53 and 81 (see FIGS. 9A and 9B). In the case shown in FIG. 9B, the wing members 41 clear the trough 52 in the adjustment.

Figure 10:
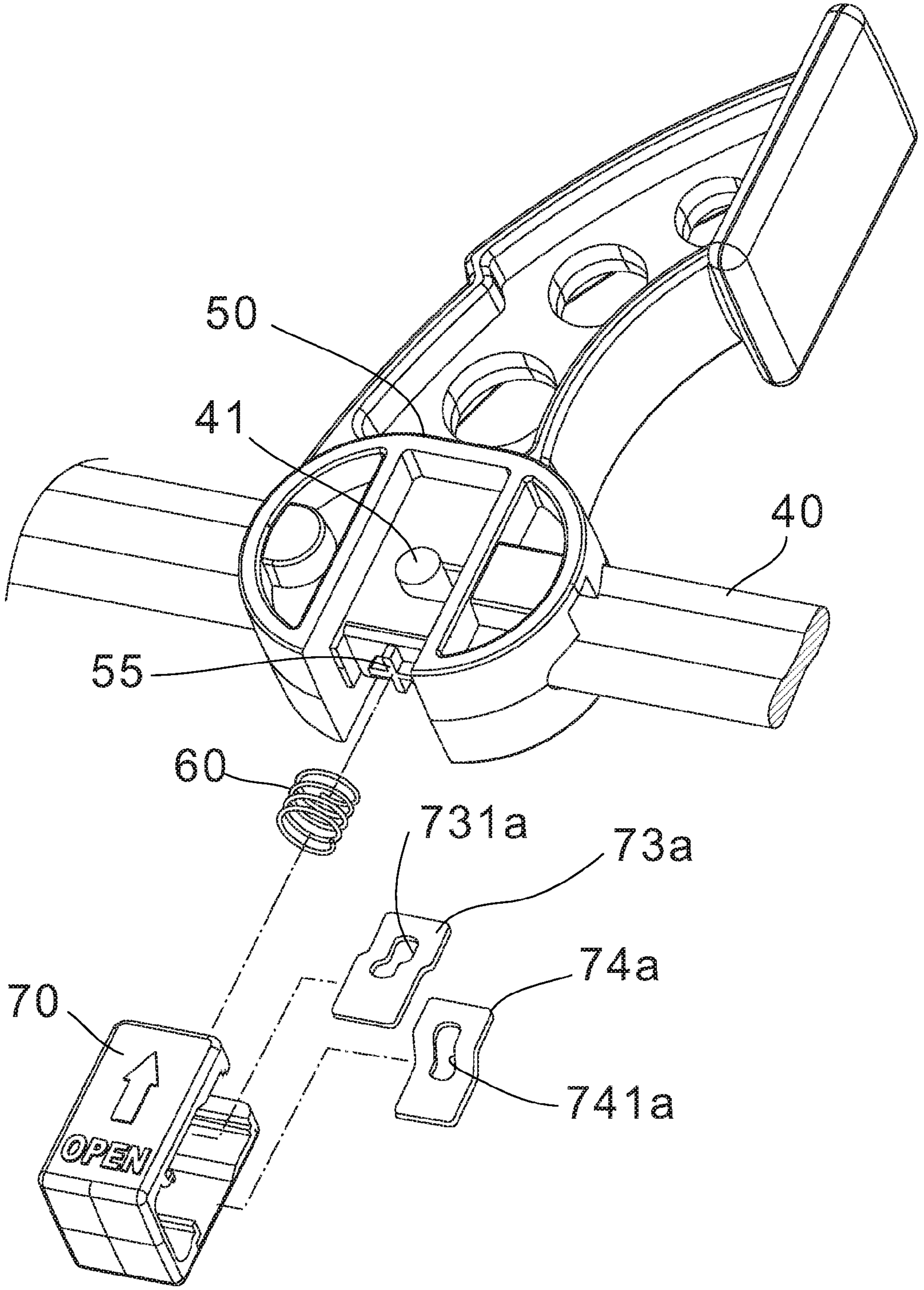
FIG. 10 is a perspective exploded view of a slide bar and a moveable jaw carrier according to a second preferred embodiment of bar clamp of the invention.
Figure 11:
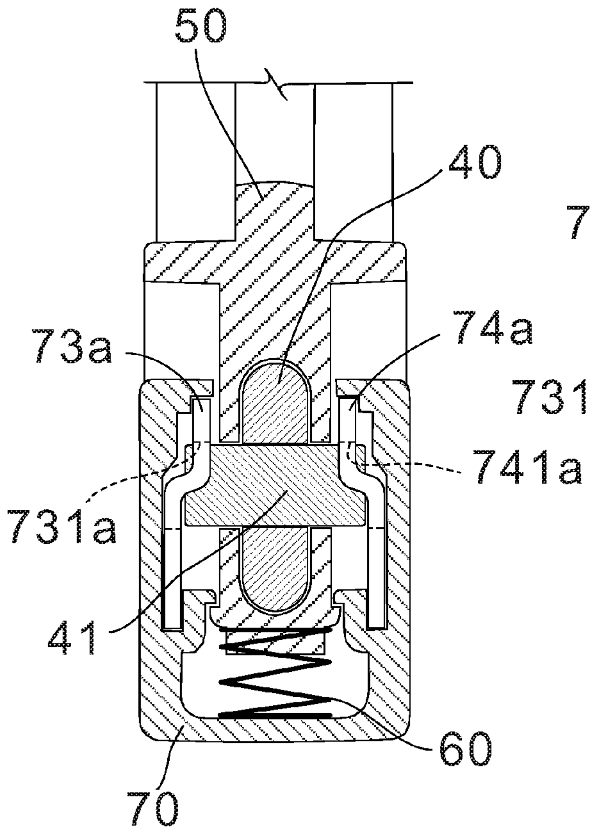
FIG. 11 is a longitudinal sectional view of a lower central portion of FIG. 10 where the moveable jaw carrier is locked.
Figure 12:
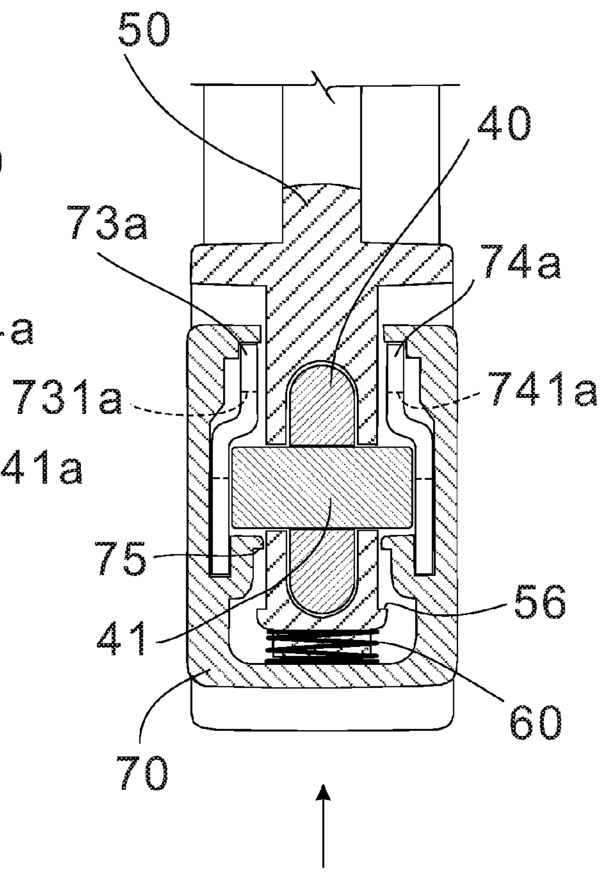
FIG. 12 is a view similar to FIG. 11 where the moveable jaw carrier is unlocked.

Referring to FIGS. 10 to 12, a bar clamp in accordance with a second preferred embodiment of the invention is shown. The characteristics of the second preferred embodiment are the lock assembly 70 as discussed in detail below.

The lock assembly 70 has a longitudinal section of U and comprises a bent first lock member **73*a* having a slot 731*a*, and a bent second lock member 74*a* having a slot 741*a*. Each slot 731*a* or 741*a* has width slightly greater than diameter of the wing member 41 so as to either put thereon in a locked position (see FIG. 11) or disengage therefrom in an unlocked position (see FIG. 12). The first and second lock members 73*a*, 74*a* are releasably fastened on two opposite inner, stepped surfaces of the upright portions of the lock assembly 70. The projections 75 are engaged with the stop members 56 in the locked position of the lock assembly 70. The helical spring 60 is biased between bottom of the locking assembly 70 and the anchor member 55 to urge the stop members 56 against the projections 75** from below.

For unlocking the second moveable jaw carrier 50, a user may push the locking assembly 70 upward with one hand until being stopped with the spring 60 compressed (see FIG. 12). Both the first and second lock members **73*a*, 74*a* move upward with the slots 731*a*, 741*a* being disengaged from the wing members 41 (see FIG. 12). Next, the user may push the second moveable jaw carrier 50** leftward to adjust a distance between two jaws in a manner substantially the same as described with respect to the first embodiment.

While the invention herein disclosed has been described by means of specific embodiments, numerous modifications and variations could be made thereto by those skilled in the art without departing from the scope and spirit of the invention set forth in the claims.

What is claimed is:

1. A bar clamp comprising:

a handgrip;

a first moveable jaw carrier comprising a first jaw;

a slide bar comprising two opposite wing members;

a second moveable jaw carrier disposed in front of the first moveable jaw carrier and comprising a second jaw, a transverse channel, a trough extending from an intermediate portion of the channel to one end of the channel, a recess opposing the second jaw, and two opposite stop members in the recess wherein the slide bar passes the channel with the wing members being stopped by the trough in a locked position; and a spring-actuated lock assembly slidably mounted in the recess and having a longitudinal section of U, the lock assembly comprising inverted U-shaped opposite first and second lock members being engaged with the wing members in the locked position, a first projection between the first lock member and a bottom of the lock assembly, and a second projection between the second lock member and the bottom of the lock assembly, the first and second projections being engaged with the stop members in the locked position, whereby pushing the locking assembly until being stopped will disengage the first and second lock members from the wing members to dispose both the slide bar and the second moveable jaw carrier in an unlocked position.

2. The bar clamp of claim 1, wherein the first and second lock members are releasably secured to two wall portions of the lock assembly.

3. The bar clamp of claim 2, wherein one wall portion of the lock assembly is formed with a first slot, the first lock member comprises a first tab releasably fastened in the first slot, the other wall portion of the lock assembly is formed with a second slot, and the second lock member comprises a second tab releasably fastened in the second slot.

4. A bar clamp comprising:

a handgrip;

a fixed jaw carrier comprising a first jaw;

a slide bar comprising two opposite wing members;

a moveable jaw carrier disposed in front of the fixed jaw carrier and comprising a second jaw, a transverse channel, a trough extending from an intermediate portion of the channel to one end of the channel, a recess opposing the second jaw, and two opposite stop members in the recess wherein the slide bar passes the channel with the wing members being stopped by the trough in a locked position; and a spring-actuated lock assembly slidably mounted in the recess and having a longitudinal section of U, the lock assembly comprising inverted U-shaped opposite first and second lock members being engaged with the wing members in the locked position, a first projection between the first lock member and a bottom of the lock assembly, and a second projection between the second lock member and the bottom of the lock assembly, the first and second projections being engaged with the stop members in the locked position, whereby pushing the locking assembly until being stopped will disengage the first and second lock members from the wing members to dispose both the slide bar and the moveable jaw carrier in an unlocked position.

5. The bar clamp of claim 4, wherein the first and second lock members are releasably secured to two wall portions of the lock assembly.

6. The bar clamp of claim 5, wherein one wall portion of the lock assembly is formed with a first slot, the first lock member comprises a first tab releasably fastened in the first slot, the other wall portion of the lock assembly is formed with a second slot, and the second lock member comprises a second tab releasably fastened in the second slot.

7. A bar clamp comprising:

a handgrip;

a fixed jaw carrier comprising a first jaw;

a slide bar comprising two opposite wing members;

a moveable jaw carrier disposed in front of the fixed jaw carrier and comprising a second jaw, a transverse channel, a trough extending from an intermediate portion of the channel to one end of the channel, a recess opposing the second jaw, and two opposite stop members in the recess wherein the slide bar passes the channel with the wing members being stopped by the trough in a locked position; and a spring-actuated lock assembly slidably mounted in the recess and having a longitudinal section of U, the lock assembly comprising bent opposite first and second lock members each having a slot being put on the wing members in the locked position, a first projection between the first lock member and a bottom of the lock assembly, and a second projection between the second lock member and the bottom of the lock assembly, the first and second projections being engaged with the stop members in the locked position, whereby pushing the locking assembly until being stopped will disengage the slots of the first and second lock members from the wing members to dispose both the slide bar and the moveable jaw carrier in an unlocked position.

8. The bar clamp of claim 7, wherein the first and second lock members are releasably secured to two wall portions of the lock assembly.

* * * * *